UNITED STATES PATENT OFFICE.

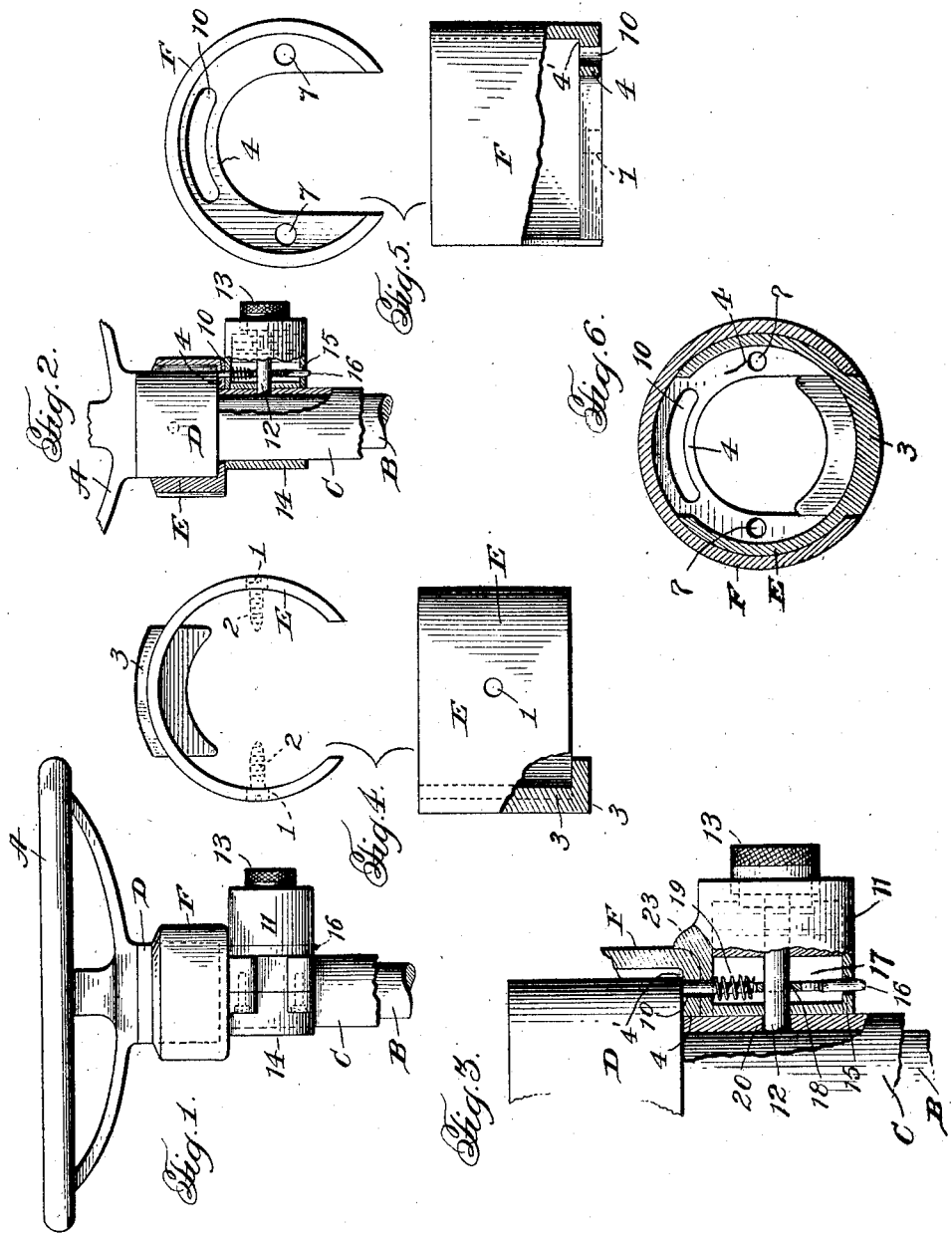

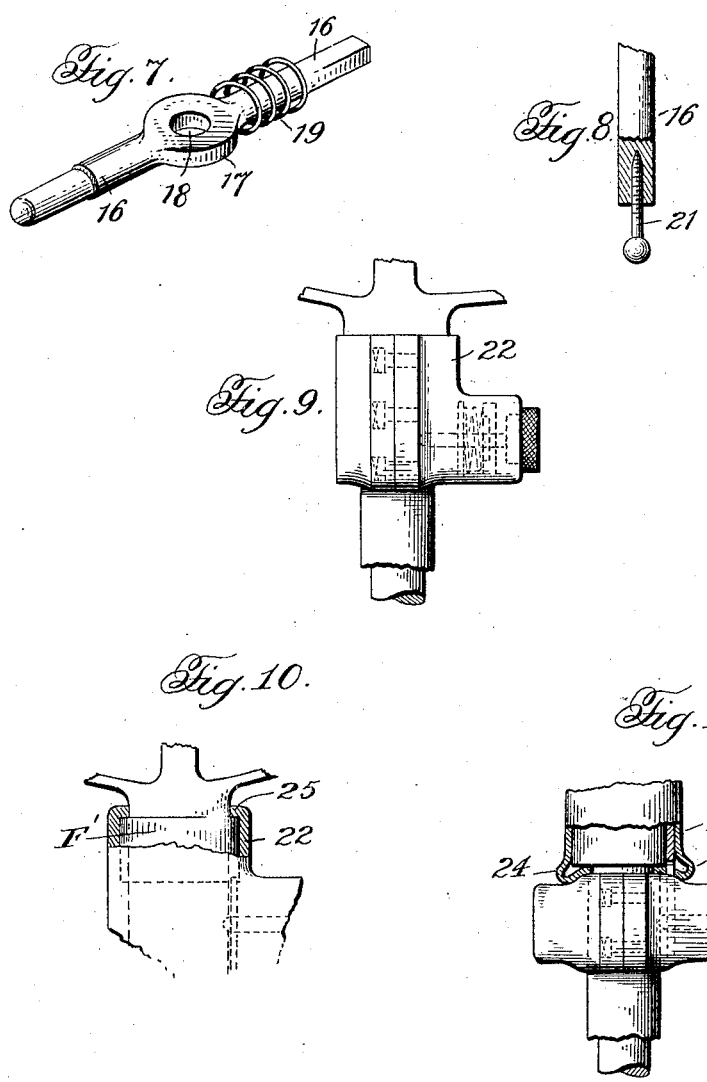

ARTHUR E. MILLER, OF SACRAMENTO, CALIFORNIA.

SAFETY LOCK MECHANISM.

1,394,327.   Specification of Letters Patent.   Patented Oct. 18, 1921.

Application filed April 6, 1920. Serial No. 371,695.

*To all whom it may concern:*

Be it known that I, ARTHUR E. MILLER, a citizen of the United States, residing at Sacramento, in the county of Sacramento and State of California, have invented certain new and useful Improvements in Safety Lock Mechanism, of which the following is a specification.

My invention relates to certain new and useful improvements in devices for locking the steering gear of an automobile, bicycle or the like, say after the wheels have been turned to one side or the other of a straight line. One of the objects of the invention is to provide an improved safety mechanism so that the machine cannot be operatively driven forward by an unauthorized person, thereby safeguarding the machine when left in the owner's absence and overcoming the loss and annoyance which are caused by the removal of the machine without the owner's knowledge.

With the above and other objects in view my invention consists of the parts and constructions, and arrangements and combinations of parts forming the safety locking means which I will hereinafter fully describe and point out in the appended claims.

In the drawings forming part of this specification and in which similar reference characters indicate like parts in the several views, Figure 1 represents a steering wheel and a fragment of the steering column of an automobile or like vehicle, showing my improved locking means applied thereto.

Fig. 2 is a similar view partly in section to show the co-acting locking bolts and sleeves.

Fig. 3 is an enlarged part elevation and part sectional detail, of a lock and associated parts.

Fig. 4 is a plan view and side elevation of the inner locking sleeve.

Fig. 5 is a plan view and side elevation of the outer locking sleeve.

Fig. 6 is a plan view of the assembled sleeves.

Fig. 7 is a perspective view of the slidable bolt.

Fig. 8 shows a fragment of a bolt of modified form.

Figs. 9, 10 and 11 illustrate modifications of the lock casing which I will hereinafter describe.

In the prior Patents Nos. 1,312,938 and 1,312,939, both dated August 12, 1919, and issued to Clarence E. Anable, there is disclosed a form of lock for the steering gear of an automobile or the like which will be found useful in association with the safety locking means which I will hereinafter describe, but it will be understood that the present invention is not limited in its application or use to said specific form of lock or in fact to any particular type of lock since the locking means may be successfully used in connection with various forms of securing devices.

In my prior application, filed September 14, 1919, Ser. No. 321,710, I have disclosed a safety locking means of the general type of the one I am about to describe, but over which former construction the present invention is believed to possess many advantages and to be a decided improvement.

Heretofore, so far as I am advised, the locking devices which have been applied to steering columns and the like have a sleeve in the form of a complete circle with a hole or recess cut or otherwise made therein for the reception of the bolt of the lock which is used. One serious difficulty with the prior constructions employing these complete sleeves, is that such sleeves can only be removed from the steering column by first taking off the steering wheel and then removing the usual spark and gas-control elements which are associated therewith. Also, in the prior constructions where a locking sleeve is omitted, and a hole is drilled into the steering post for the reception of the locking bolt, a recognized objection has been that the drilling of the hole weakens the post and holds the steering wheel rigid in one position while the car is locked. To meet these objections I employ in the present case, two concentric sleeves, each of which is less than a complete circle, so as to enable the inner sleeve to be laterally slipped over the steering column and then slid upwardly over the part of the wheel to be engaged, and the outer sleeve to be likewise applied to the housing and then slipped endwise over the inner sleeve, after the latter has been fixed in place.

In the present case, it is my purpose to secure the aforesaid sleeves which constitute essential parts of the safety locking means, to the cap or sleeve usually made integral with the base of the steering wheel and surrounding the upper portion of the steering column and to this end, the inner diameter of the inner sleeve is greater than that of the column and about equal to the exterior diameter of the said cap with which the steering wheel is provided, the opening in the side of this sleeve being just about sufficient to allow the sleeve to be passed laterally over the column, after which the sleeve may be readily slid endwise onto the cap. The outer sleeve is likewise applied, and its internal diameter is about equal to the exterior diameter of the inner sleeve, which it embraces.

In the said drawings, A, represents the usual steering wheel which is fixed to the top of the steering post, B, said post having the usual housing, C, and the steering wheel being provided with the usual metal cap or sleeve, D. It will be understood that in using the words "steering column" I am referring to the part usually known as such and including the steering post and its inclosing housing. The inner locking sleeve is represented at E, and its general form is shown in Fig. 4. This sleeve is formed with threaded openings, 1, to receive suitable set screws, 2. These I prefer to be of such type that after they are once inserted, and the sleeve secured in place to the cap, said screws cannot be removed by a reverse action of a screw driver or like tool. Such a screw as I have found suitable for the purpose is found in the prior Patent No. 1,312,409, dated August 5, 1919, it being understood that the inner ends of these screws engage threaded openings in the metal cap of the steering wheel.

On the side of the sleeve diametrically opposite the opening, the sleeve may be provided with a rib, 3, which extends substantially its entire length and which will serve as a support for the outer or companion sleeve, F, when the sleeves are properly positioned one within the other, as shown in Fig. 6.

The outer sleeve, F, is likewise recessed through one of its sides to allow it to be first laterally applied to the column and then slid upwardly over the first-named sleeve when the latter has been secured to the cap of the steering wheel, said outer sleeve having an inwardly projecting flange, 4, the sides of which form abutments or shoulders for the lower end portions of the lug, 3, of the inner sleeve. Preferably, the end of the outer sleeve is turned inward so as to underlie the lower end of the inner sleeve, and this inturned or flanged portion will form the annular shoulder, 4, which is designed to fit up against the underside of the metal cap, D, and thus prevent the sleeve from being forced too high on the cap, said outer sleeve having its bottom flange provided with openings, 7, to receive screws, which pass therethrough and into the bottom of the metal cap D, so as to secure the outer sleeve to the cap. It will be understood that when the outer sleeve is in position its sides conceal and prevent access to the screws, 2, which are employed for fixing the inner sleeve to the cap, thereby making it impossible to remove the safety device without substantially destroying the same.

The sleeves may be arranged in much the same manner described in my aforesaid prior application and when so assembled the rib, 3, on the one sleeve will occupy the space between the side walls of the opening in the other sleeve and the solid side of the outer sleeve will cover the open side of the inner sleeve, the inner sleeve having its lower edge abutting the inturned flanged bottom, 4, of the other sleeve and the rib of the inner sleeve being sufficiently extended below the bottom of this sleeve to allow its bottom to be substantially flush with the inturned bottom of the outer sleeve, said bottom of the outer sleeve being also formed with a segmental slot, 10, which is designed for the reception of the end of a bolt of the lock, the slot being sufficiently long to allow the end of the bolt to play sidewise back and forth therein and the end walls of the slot determining the distance which the steering wheel may be turned either to the right or to the left; in other words, the length of the slot is in excess of the diameter of the bolt, which is desirable as such an arrangement does not call for the accurate register of the end of the bolt with a notch or opening of substantially similar size, as in the case of many of the prior constructions. In brief the arrangement is such that the sleeves are so secured to the metal cap of the steering wheel that the front wheels of the vehicle may be locked to the left or right, but they can also be turned farther to the left (or right if locked to the right), the length of the slot, however, enabling one to readily lock the car with its wheels at a desired angle. If the space or opening to receive the locking bolt, which I will presently describe, were small or approximately only equal to the diameter of the entering end of the bolt, the vehicle wheels would have to be turned exactly to a certain point to make the opening register with the end of the bolt, but with a sleeve arrangement such as I have described and shown, the wheels after they are turned to a certain angle may be turned almost to any degree to the left farther than that and the car will still be locked against unlawful appropriation.

To the housing of the steering post just under the lower end of the sleeves I appropriately secure the casing 11, of the lock which is employed for securing the steering wheel in its locked position. The type of lock shown for illustrative purposes is similar to the one found in the aforesaid prior patents, and may be secured in the manner therein mentioned. This lock has a combined rotary and axially movable locking bolt, 12, and will be provided with complementary tumblers 12' shown by dotted lines in Figs. 2, 3 and 9 and other parts necessary for the operation of a combination lock. These, however, form no part of the present invention, and are not shown in detail and may be of any well known and appropriate character. It is sufficient to say that the locking pin is fixed to an appropriate head, 13, which projects through the outer end of the lock casing and in practice will have its surface provided with a mark or designation useful in combination locks and which is used in connection with numerals or other indicia on the lock casing, for the working of the proper combination.

In the present case I change the construction of the aforesaid patented lock in that I now form one of the halves of the clamp or shackle, 14, which secures the lock to the steering column with an opening, 15, which is arranged at right-angles to the bolt, 12, of the lock and substantially parallel with the axis of the aforesaid column and within this opening I mount a sliding bolt, 16, said bolt being of greater length than the diameter of the lock casing so that the inner end of the bolt may be projected into the curved slot or opening, 10, which is formed in the underside of the bottom of the sleeve, F, secured to the metal cap of the steering wheel. The sliding bolt, 16, has its opposite ends mounted in the housing or casing of the lock and its upper portion is depressed between its ends to form a flattened seat, 17, for the inner end of the longitudinal bolt, 12, said sliding bolt having also in an intermediate portion, an opening, 18, which is designed to be brought into register with the inner end of the bolt, 12, so that the latter may be projected through the opening and thus lock the sliding bolt in a fixed locked position. The sliding bolt is suitably connected to a spring, 19, which is designed to force the bolt into an unlocked position or out of and away from its engagement with the locking sleeve, when the combination with which the lock is supplied has been properly worked to enable the bolt, 12, which is connected to the operating head to be pulled out sufficient to clear the aforesaid opening. When this occurs, the inner end of the bolt, 12, will rest upon the solid seat provided on the surface of the sliding bolt at one side of the hole, 18, whereby the bolt, 12, will be held in an outward unlocked position with its end out of register with the opening in the sliding bolt, 16, and accordingly there will be no danger of the accidental locking of the parts by the opening in the sliding bolt being brought into register with the end of the bolt, 12. In this condition the outer end of the sliding bolt will project beyond the side of the lock casing or housing and in such position that it may be readily operated. To operate the lock the combination is worked by the turning of the milled head, 13, of the bolt, 12, and when the several tumblers of the lock are in their proper position, the outer projecting portion of the sliding bolt is engaged by the fingers and pressed in until the locking end thereof enters the curved slot, 10, formed in the bottom of the locking sleeve, F. This movement brings the opening, 18, in the sliding bolt, 16, into register with the end of the turnable bolt, 12, so that the latter may now be forced inward through said opening and into the housing of the steering post, which will have an opening, 20. Then by rotating the head of the turnable bolt, 12, so as to scatter the tumblers, the parts are locked and can only be opened or released by one knowing the combination. In other words, to unlock the lock, the combination is first worked and the turnable bolt is lifted outwardly which draws its inner end out of the opening in the sliding bolt, when the spring, 19, immediately expands and forces the sliding bolt out of its engagement with the locking sleeve, F, and brings a solid portion of the sliding bolt in line with the end of the turnable bolt, 12, so as to prevent the latter from accidentally locking the car until the sliding bolt has been again pressed back into its locked position with its opening in register with the end of the turnable bolt. If desired, the outer end of the sliding bolt may be provided with a reduced neck, 21 (Fig. 8), or portion which will serve as a handle to permit the ordinary hand operation of this bolt, yet any attempt to force the lock by pulling forcibly on said neck or handle would only result in rupturing the same.

In some instances I may prefer to alter the form of my casing and extend the same, as shown at 22, in Figs. 9, 10, so that its interior recessed end may fit over and inclose and prevent access to the locking sleeves which are fixed to the cap of the steering wheel. The opening in the end of the extension of the lock housing is large enough to freely receive the cap and allow the steering wheel to be turned freely when the locking mechanism is unlocked. In this instance, or when using this modified form of lock, only one sleeve, F', will be required since the inner sleeve heretofore described is not now necessary as the extension of the housing forms the equivalent of an outer sleeve. In other respects the construction and arrangement of parts are similar to those heretofore described.

As it may be desirable, in fact, sometimes necessary, to protect the locking end of the slidable bolt, preferably made of hardened steel, against access thereto from the outside, I show in Fig. 3, the lock casing as having a projection or shield, 23, which covers the joint between the casing and the under portion of the sleeve which the sliding bolt engages, said shield or projection extending over the joint a sufficient distance to prevent any one from sawing or cutting the bolt. A similar result may be accomplished by enlarging and curving the lower end of the outside sleeve, F², as shown at 24, in Fig. 11. In the modification shown in Figs. 9 and 10, the lock casing which is extended to one side a sufficient distance to extend over and conceal and thereby give greater security to the outer sleeve, may have its end flanged or turned over on top of the sleeve, as shown at 25, in Fig. 10, the opening in this portion being sufficient to enable it to embrace the cap without friction or binding action. These and other changes in the construction and within the scope of the appended claims, may be resorted to without affecting the broader phases of my invention.

The present invention has all of the advantages set up for the double locking sleeve arrangement of my aforesaid prior application and increases the efficiency of the lock and the safety of the vehicle without materially adding to the cost of the prior construction. As in the prior application, the present construction allows the steering wheel of the vehicle to be turned back and forth a short distance, but the space provided for this purpose is not sufficient to permit the front wheels of the vehicle to be brought into a straight line so that the car can be driven straight ahead. It will also be understood that in the present arrangement the sleeves can be put on so that the car wheels are locked turned to the left and so that they cannot be turned straight or the sleeves can be so attached that the wheels may be locked turned to the right, and not capable of being straightened; to conform to usual city ordinances the sleeves are generally so attached and the parts so arranged as to lock the wheels to the left.

It will further be apparent that in the before described construction of each of the sleeves there is left an opening in the side thereof which is of sufficient width to enable the sleeves to be laterally applied to the steering column. When the inner sleeve has been applied, as stated, it is then moved longitudinally of the column and up onto the cap portion of the wheel. Then the outer sleeve is likewise applied to the column and slipped endwise over the first named sleeve; the sleeves may now be held in place to all intents and purposes by the subsequently-applied lock-casing which is fixed to the column just under the bottom of the cap and in such position that it blocks any endwise removal of the sleeves. If there were no screws in either of the sleeves, neither of said sleeves could be removed from the cap, because the openings in the sides of the sleeves, while sufficient to permit the sleeves to be laterally passed onto the smaller housing, are not sufficient to allow the sleeves to be removed laterally from the cap, but to be removed from the latter, each of the sleeves will have to be first moved endwise from each other and from the cap and onto the smaller housing, and when the lock casing is in place it prevents any such movement. Hence, the lock casing may serve as a means for holding the sleeves against end displacement, and where screws are employed they may serve purely for the purpose of preventing the sleeve or sleeves from rotary motion on the cap. It is also not essential that screws should be employed for securing the inner sleeve to the cap since when the outer sleeve is applied, it covers the first sleeve, and said outer sleeve might be secured by the safety screws, or otherwise.

In all instances, however, after the sleeve or sleeves are applied to the cap, and the lock casing is attached to the steering column just under the cap, said casing prevents any endwise removal of either sleeve, while the bottom flange of the outer sleeve prevents this sleeve from being forced too high on the cap as it abuts against the shoulder formed by the underside of the said cap.

The form of lock used is unimportant since it is only necessary that said lock have a bolt which may be made to engage with and disengage from the outer locking sleeve, and while I have shown a lock which employs two bolts one operating crosswise of the other, it will be apparent that so much of the invention as relates to the locking sleeves is not limited to this particular kind of lock, and that said sleeves may be used in connection with any lock having a sliding bolt, adapted to engage the opening in the bottom of the sleeve to thereby securely lock the car by holding the steering wheels at an angle to a true forward movement.

Having thus described my invention what I claim as new and desire to secure by Letters Patent is:—

1. In a vehicle safety lock, the combination with a steering column and a hand wheel thereon, of a sleeve fixed to the said wheel and having an opening, and a lock having a pair of bolts one arranged substantially crosswise of the other, one of said bolts adapted to be locked to the steering column and the other bolt adapted to interlock with the opening in said sleeve.

2. A safety lock mechanism for vehicles, comprising steering mechanism and a lock therefor said lock having a pair of co-acting bolts one arranged crosswise of the other, said bolts each adapted to lock with a separate member of the steering mechanism, one of said bolts adapted to pass through the other and hold the same in locked position, and the other bolt adapted to maintain the first named bolt in an unlocked position and having an opening for the passage of the end of the first-named bolt when moved into register therewith.

3. In a vehicle safety lock, the combination with a steering column and a hand wheel thereon, of a sleeve fixed to the hand wheel and having an elongated opening, and a lock having a pair of co-acting bolts, one arranged substantially crosswise of the other, one of said bolts having a combined rotary and axial movement and adapted to engage the other bolt, and the last named bolt being slidable and adapted to interlock with the opening in said sleeve.

4. In a vehicle safety lock, the combination with a steering column and a hand wheel thereon, of a pair of concentric sleeves one of said sleeves being fixed to the said wheel and the other inclosing the first-named sleeve, and having a portion provided with an elongated opening, and a lock having a pair of bolts one arranged substantially crosswise of the other, one of said bolts adapted to be projected into locking engagement with the steering column, and the other bolt adapted to be projected into locking engagement with the opening in said second named sleeve.

5. In a vehicle safety lock, the combination with a steering column and a hand wheel thereon, of a pair of segmental sleeves one of which is fixed to the hand wheel and the other of which embraces the first named sleeve, and is provided with an opening, and a lock having a pair of bolts one arranged substantially crosswise of the other, one of said bolts adapted to be projected into locking engagement with the steering column, and the other bolt being slidable into and out of engagement with the opening in said second named sleeve.

6. In a vehicle safety lock, the combination with a steering column, and a hand wheel thereon, of a pair of coacting sleeves each forming less than a complete circle, one of said sleeves adapted to be laterally applied to the steering column and then longitudinally moved into engagement with the hand wheel and the other to be similarly applied and then longitudinally moved into engagement with the companion sleeve, so as to inclose the latter, said second-named sleeve having a bottom flange fitting up against the bottom of the hand wheel, and provided with an opening, and a lock having a pair of bolts one arranged substantially crosswise of the other, one of said bolts adapted to be projected into locking engagement with the steering column, and the other bolt being slidable into and out of engagement with the opening in said second sleeve.

7. A safety locking mechanism for vehicles, comprising a steering column, a hand wheel thereon, a sleeve fixed to the hand wheel and having an opening, and a lock having a pair of bolts one arranged substantially crosswise of the other, one of said bolts adapted to be projected into locking engagement with the steering column, and the other bolt being spring-actuated and adapted to interlock with the opening in said sleeve.

8. In a vehicle safety lock, the combination with a steering column and a hand wheel thereon, of a sleeve fixed to the hand wheel and having a bottom flange abutting the lower end of the said wheel, and provided with an opening, and a lock having a pair of bolts one arranged substantially crosswise of the other, one of said bolts adapted to be projected into and out of engagement with the steering column, and the other bolt being slidable and adapted to enter the opening in said sleeve and having an opening intermediate of its ends for the reception of the first mentioned bolt when alined with the end thereof.

9. In a vehicle safety lock, the combination with a steering column and a hand wheel thereon, of a sleeve fixed to the hand wheel and having a bottom flange abutting the lower end of the said wheel, and provided with an opening, and a lock having a pair of bolts one arranged substantially crosswise of the other, one of said bolts adapted to be projected into and out of engagement with the steering column, and the other bolt being slidable and adapted to enter the opening in said sleeve and having an opening intermediate of its ends for the reception of the first mentioned bolt when alined with the end thereof, said slidable bolt being spring-actuated whereby it is automatically retracted from said first opening when the first mentioned bolt is withdrawn from the opening in the slidable bolt, thereby carrying said latter opening out of register with the first mentioned bolt.

10. In a vehicle safety lock, the combination with a steering column, and a hand wheel mounted thereon, of a lock having a casing and a pair of bolts one arranged substantially crosswise of the other, one of said bolts having a combined longitudinal and rotary motion and adapted to interlock with said column, and the other bolt being slidable and spring-actuated, and a sleeve fixed to the hand wheel and having a flanged bottom with an opening in register with the end of the slidable bolt, said slidable bolt extending through the opposite side of the lock casing and having in an intermediate portion an opening adapted to register with the end of the first-named bolt to allow the latter to be projected therethrough to engage the column, and said bolt opening being automatically carried out of register with the first named bolt when the latter is withdrawn from its engagement with the opening, thereby preventing the return of the withdrawn bolt until the sliding bolt is actuated to again bring said hole back into register with the end of the first-named bolt.

11. In a vehicle safety lock, the combination with a steering column hand wheel thereon, and a sleeve fixed to the hand wheel and having a base portion provided with an opening, of a lock having a casing and a pair of bolts one arranged substantially crosswise of the other, one of said bolts extending axially of the casing and having longitudinal movement adapting it to be projected into engagement with the column, and the other bolt being spring-actuated and extending transversely through the lock casing, and having an opening for the passage of the first-named bolt, when said opening is in register therewith, said spring-actuated bolt adapted to prevent the actuation of the first-named bolt until its opening is in register therewith.

12. In a vehicle safety lock, the combination with a steering column and a hand wheel thereon, of a sleeve embracing a portion of said hand wheel and having a flanged bottom with an opening therein, a lock casing fixed to the column and provided with a pair of bolts one arranged substantially crosswise of the other, one of said bolts having an opening through which the other bolt may be projected to engage said column, and said other bolt adapted to engage the opening in said sleeve, said lock casing having a portion extended to cover the joint between the casing and the sleeve and thereby prevent the access to the end of the apertured bolt.

13. In a vehicle safety lock, the combination with a steering column, and a hand wheel thereon, of a pair of segmental sleeves one of said sleeves adapted to be laterally applied to said column and then longitudinally moved into engagement with a portion of said hand wheel and secured thereto, and the other sleeve being applied to the column and then longitudinally moved into engagement with the first mentioned sleeve, so as to cover the latter, one of said sleeves having a flanged bottom provided with an elongated opening, and the other sleeve having a projecting lug to fit the space between the separated sides of the first mentioned sleeve, one of said sleeves being supported on the other, a lock casing fixed to said column and provided with a plurality of bolts one of which is adapted to engage the column and the other to engage the outermost sleeve, said bolts being arranged one crosswise of the other and having an opening for the passage thereof, said lock casing having a part extending along the exterior of the second-named sleeve.

14. In a vehicle safety lock, the combination with a steering column and a hand wheel thereon, said hand wheel having a cap surrounding a portion of said column, of a sleeve having a side opening enabling it to be laterally applied to the steering column and having an internal diameter about equal to the external diameter of the cap on the hand wheel whereby the sleeve may be slid longitudinally of the steering column and onto the cap, a lock on the steering column having its casing disposed proximate the end of the sleeve, said lock having a sliding bolt, and the end of the sleeve having an opening to receive said bolt.

15. In a vehicle safety lock, the combination with a steering column and a hand wheel thereon, said hand wheel having a cap thereon, of a locking sleeve of less than a complete circle to enable it to be laterally applied to the column, said sleeve having an internal diameter in excess of the external diameter of the column and about equal to the external diameter of the cap, whereby after being applied to the column said sleeve may be moved endwise onto the cap, a lock having a casing fitted to the column adjacent the end of the cap and preventing endwise removal of the sleeve, said lock casing having a bolt operating therethrough adapted to be moved into and out of engagement with the end of the sleeve, and said sleeve having an opening for the end of the bolt.

16. In a vehicle safety lock, the combination with a steering column and a hand wheel thereon, said wheel having a cap thereon, of a pair of sleeves arranged concentric with the cap and with each other, each of said sleeves being less than a complete circle to provide an open side which enables the sleeves to be successively first applied to the column and then moved longitudinally thereof one onto the cap and the other onto the companion sleeve; and a lock having a casing fitted to said column just under the cap and blocking endwise removal of the sleeves therefrom, said lock having a bolt operating through its casing, and one of said sleeves having an opening to receive the end of said bolt.

17. A safety locking mechanism for vehicles, comprising a steering column, a hand wheel thereon, a pair of co-acting sleeves fitted upon and fixed to a portion of said hand wheel, each sleeve forming more than half a circle and each with just sufficient space between its open ends to permit such sleeves to be slipped over and onto the column and thence up on to the said portion of the wheel, but such openings being too narrow to permit the sleeves to be removed from the hand wheel unless the same are first returned to the column, a lock securely fixed to the column immediately beneath the hand wheel and locking sleeves which prevents the sleeves from being returned to the column, said lock having a bolt, and one of said sleeves having an aperture into which the bolt is projected to lock the device and from which its removal is caused or permitted by unlocking the lock.

In testimony whereof I affix my signature.

ARTHUR E. MILLER.